(12) United States Patent
Carlson

(10) Patent No.: US 11,979,487 B1
(45) Date of Patent: *May 7, 2024

(54) SYSTEM AND METHOD FOR MINING DIGITAL CURRENCY IN A BLOCKCHAIN NETWORK

(71) Applicant: Marvell Asia Pte, Ltd., Singapore (SG)

(72) Inventor: David A. Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,873

(22) Filed: Aug. 5, 2022

Related U.S. Application Data

(63) Continuation of application No. 16/544,203, filed on Aug. 19, 2019, now Pat. No. 11,438,142.

(51) Int. Cl.
*H04L 29/06* (2006.01)
*G06Q 20/06* (2012.01)
(Continued)

(52) U.S. Cl.
CPC ....... *H04L 9/0643* (2013.01); *G06Q 20/0658* (2013.01); *G06Q 20/389* (2013.01);
(Continued)

(58) Field of Classification Search
CPC . H04L 9/0643; H04L 9/0637; H04L 2209/38; H04L 9/30; H04L 9/0618;
(Continued)

(56) References Cited

U.S. PATENT DOCUMENTS 11,438,142 B1  9/2022  Carlson
11,770,256 B1  9/2023  Carlson
(Continued)

FOREIGN PATENT DOCUMENTS

WO   2015077378 A1   5/2015

OTHER PUBLICATIONS

Antonopoulos, "Mastering Bitcoin. Unlocking Digital Cryptocurrencies," O'Reilly Media, Apr. 2014, (Year: 2014).
(Continued)

*Primary Examiner* — Malcolm Cribbs
(74) *Attorney, Agent, or Firm* — Hamilton, Brook, Smith & Reynolds, P.C

(57) ABSTRACT

A circuit and corresponding method enable mining for digital currency in a blockchain network. The circuit comprises a controller and at least one partial hash engine that (i) implements a hash function, partially, to compute a partial hash digest of a final hash digest for a block header of a block candidate and (ii) generates a notification based on determining that the partial hash digest satisfies a criterion. The controller includes a complete hash engine that implements the hash function, completely. In response to the notification generated, the controller activates the complete hash engine to compute, in its entirety, the final hash digest for the block header, effectuating a decision for submission of the block candidate with the block header to the blockchain network for mining the digital currency. Power savings and reduction in area are achieved relative to multiple hash engines that compute the entire final hash digest.

57 Claims, 8 Drawing Sheets

(51) Int. Cl.
*G06Q 20/38* (2012.01)
*G06Q 20/40* (2012.01)
*H04L 9/06* (2006.01)
*H04L 9/00* (2022.01)

(52) U.S. Cl.
CPC ......... *G06Q 20/401* (2013.01); *H04L 9/0637* (2013.01); *G06Q 2220/00* (2013.01); *H04L 9/50* (2022.05)

(58) Field of Classification Search
CPC ... H04L 9/3247; H04L 9/3239; H04L 9/3263; H04L 2209/56; H04L 9/0656; H04L 9/50; G06Q 20/0658; G06Q 20/389; G06Q 20/06; G06Q 20/382; G06Q 20/401; G06Q 2220/00; G06Q 20/381; G06Q 40/04; G06Q 20/3825; G06Q 20/3827; G06F 21/62; G06F 21/6209; G06F 21/6218; G06F 21/6227; G06F 21/64; G06F 16/1824; G06F 21/44; G06F 21/629; G06F 16/2379; G06F 16/9027; G06K 9/00577; G06K 2009/00583
See application file for complete search history.

(56) References Cited

U.S. PATENT DOCUMENTS

| | | | |
|---|---|---|---|
| 2002/0051537 A1 | 5/2002 | Rogaway | |
| 2003/0033473 A1 | 2/2003 | Blodgett | |
| 2003/0088840 A1 | 5/2003 | Yonezawa et al. | |
| 2007/0245147 A1 | 10/2007 | Okeya | |
| 2010/0231420 A1 | 9/2010 | Wei et al. | |
| 2011/0096820 A1 | 4/2011 | Lavery et al. | |
| 2013/0268497 A1* | 10/2013 | Baldwin | G06F 3/0683 707/E17.002 |
| 2017/0300875 A1 | 10/2017 | Gilboa et al. | |
| 2018/0004242 A1 | 1/2018 | Suresh et al. | |
| 2018/0006807 A1 | 1/2018 | Suresh et al. | |
| 2018/0032741 A1 | 2/2018 | Hogben et al. | |
| 2018/0048337 A1 | 2/2018 | Stanley-Marbell et al. | |
| 2018/0059178 A1 | 3/2018 | Wang et al. | |
| 2018/0129476 A1 | 5/2018 | Wesson et al. | |
| 2019/0164153 A1 | 5/2019 | Agrawal et al. | |
| 2020/0412544 A1 | 12/2020 | Kheterpal et al. | |

OTHER PUBLICATIONS

U.S. Appl. No. 16/447,865, entitled "System and Method for Bitcoin Mining with Reduced Power," filed Jun. 20, 2019.
Secure Hash Standard (SHS), Federal Information Processing Standards Publication 180-4, Information Technology Laboratory, National Institute of Standards and Technology, Gaithersburg, MD 20899-8900, 36 pages (Aug. 2015).
Hanke, Timo, "AsicBoost—A Speedup for Bitcoin Mining," Retrieved from the internet at: https://arxiv.org/ftp/arxiv/papers/1604/1604.00575.pdf, Retrieved on: Mar. 15, 2019, 10 pages (Mar. 31, 2016).
"Block hashing algorithm," Retrieved from the internet at: https://en.bitcoin.it/wiki/Block_hashing_algorithm, Retrieved on Jun. 7, 2019, 3 pages.
Eremenko, Kirill, "How does Bitcoin / Blockchain Mining work?," Retrieved from the internet at: https://medium.com/swlh/how-does-bitcoin-blockchain-mining-work-36db1c5cb55d, Retrieved on Jun. 3, 2019, 10 pages (May 3, 2018).
"Everything you need to know about Bitcoin mining," Retrieved from the internet at https://www.bitcoinmining.com/, Retrieved on Feb. 25, 2019, 11 pages.
"Nonce," Retrieved from the internet at https://en.bitcoin.it/wiki/Nonce, Retrieved on Feb. 25, 2019, 1 page.
Nadeem, "How Bitcoin mining really works", May 2018, https://www.freecodecamp.org/news/how-bitcoin-mining-really-works-38563ec38c87/ (Year: 2018).
Kuo et al. "Blockchain distributed ledger technologies for biomedical and health care applications", Sep. 2017, Journal of the American Medical Informatics Association, 24(6), 2017, 1211-1220 (Year: 2017).

\* cited by examiner

SYSTEM AND METHOD FOR MINING DIGITAL CURRENCY IN A BLOCKCHAIN NETWORK

RELATED APPLICATION

This application is a continuation of U.S. application Ser. No. 16/544,203, filed Aug. 19, 2019, now U.S. Pat. No. 11,438,142. The entire teachings of the above application are incorporated herein by reference.

BACKGROUND

Bitcoin is a cryptocurrency, a form of electronic cash. It is a decentralized digital currency without a central bank or single administrator. Bitcoin mining is the process of updating a ledger, that is, a distributed ledger of bitcoin transactions known as a blockchain. The process of bitcoin mining is designed to allow a decentralized network to come to a consensus in which all nodes in the decentralized network agree to the same blockchain.

In general, the decentralized network can store and reference common information in the blockchain. Each block on the blockchain includes units of information, that is, transactions. Using a predefined protocol, the blocks are linked by having their hash values inserted into a designated field in the next sequential block in the blockchain.

Bitcoin mining is performed by powerful computers in a system, that is, the decentralized network, that race against other miners, that is, mining computers, in an attempt to compute a proof-of-work for a block, that is, a next block to be added to the blockchain. Such a next block may also be referred to interchangeably herein as a block candidate. The proof-of-work function includes finding a nonce value that, when inserted into a designated field of a block header of the block, results in a cryptographic hash value of the block header that is less than a difficulty target, also referred to interchangeably herein as a target or target value. The block header stores a packed representation for its actual hexadecimal target. The target can be derived from the packed representation via a predefined formula.

Since it is believed infeasible to predict which combination of bits for the hash will result in the right hash, many different nonce values are tried, and the cryptographic hash value is recomputed for each nonce value until a cryptographic hash value that is less than or equal to a current target value of the network is found. The current target value represents the difficulty for determining the combination of bits, where a higher difficulty represents a lower target. As this iterative calculation requires time and resources, the presentation of the block with the correct nonce value constitutes proof-of-work.

The rules for mining are crafted in a way that the more mining power the system has, the harder it is to compute the proof-of-work. If more miners join, it will get harder to solve the problem; if many of them drop off, it will get easier. As such, a difficulty of the mining process is self-adjusting to an accumulated mining power that the system possesses. The chances of a particular miner successfully solving a block, that is, the chances of computing the proof-of-work for the block, are, at any particular point in time, proportional to the miner's hash rate relative to a hash rate of the whole system. Once a miner computes the proof-of-work for the block, the miner submits that block to the whole network so that the proof-of-work can be validated. While finding the proof-of-work is very hard to achieve, it is very easy to validate.

According to the Bitcoin protocol, a first miner to successfully compute the proof-of-work for the block is entitled to add the block to the blockchain and receive newly minted bitcoins as a reward. As such, the bitcoin mining process "mines" new bitcoins from the system. The main goal of mining is, however, to maintain the ledger in a decentralized manner. Each computer that validates the first miner's "solution," that is, the first miner's proof-of-work, updates its copy of the ledger with the transactions that the first miner included in the block. All the transactions in the block added by the first miner are now confirmed by the system and are virtually irreversible. In addition to receiving the newly minted bitcoins, the first miner to successfully compute the proof-of work for the block is also paid any transaction fees that were attached to the transactions that were inserted into the block.

SUMMARY

According to an example embodiment, a circuit for use in mining digital currency in a blockchain network comprises at least one partial hash engine configured to (i) implement a hash function, partially, to compute a partial hash digest of a final hash digest for a block header of a block candidate and (ii) generate a notification based on determining that the partial hash digest computed satisfies a criterion. The circuit further comprises a controller. The controller includes a complete hash engine configured to implement the hash function, completely. In response to the notification generated, the controller is configured to activate the complete hash engine to compute, in its entirety, the final hash digest for the block header to effectuate a decision for submission of the block candidate with the block header to the blockchain network for mining the digital currency.

The at least one partial hash engine may be a plurality of partial hash engines.

Each partial hash engine of the at least one partial hash engine has a reduced gate count relative to a respective gate count of the complete hash engine.

A set of gates of a plurality of gates used by the hash function to compute the final hash digest, in its entirety, are not present in the at least one partial hash engine due to deletion thereof by a place-and-route tool that identified the set of gates as unemployed for computation of the partial hash digest.

The hash function may include a first hash function configured to compute an initial hash digest by hashing the block header and a second hash function configured to compute the final hash digest by hashing the initial hash digest computed.

The first hash function may be a secure hash algorithm (SHA)-256 cryptographic hash function and the second hash function may be the SHA-256 cryptographic hash function. It should be understood that the first and second hash functions are not limited to the SHA-256 cryptographic hash function.

The first hash function may be associated with a first set of gates. The second hash function may be associated with a second set of gates. A partial set of gates, of a plurality of gates used to compute the final hash digest, in its entirety, may not be present in the at least one partial hash engine due to deletion thereof by a place-and-route tool that identified the set of gates as unemployed for computation of the partial hash digest. The partial set of gates may be from among the second set of gates.

The final hash digest may have a first length of 256 bits. The partial hash digest may have a second length of 32 bits.

It should be understood, however, that the first length is not limited to 256 bits and the second length is not limited to 32 bits.

The criterion may be that all bits of the partial hash digest have a same value. It should be understood, however, that the criterion is not limited thereto.

To determine whether the partial hash digest satisfies the criterion, the at least one partial hash engine may be further configured to perform a bitwise operation on the partial hash digest and to generate the notification based on a result produced from the bitwise operation. It should be understood that determination for whether the partial hash digest satisfies the criterion is not limited to performing a bitwise operation.

The at least one partial hash engine may be configured to drive a voltage level of a single wire to either a first voltage level or a second voltage level based on the result in order to generate the notification. It should be understood that generation of the result is limited to driving a single wire.

The at least one partial hash engine may be a plurality of partial hash engines. The block header may include a nonce field. Each partial hash engine of the plurality of hash engines may be assigned a respective unique range of nonce values, of a total range of nonce values, for selecting a nonce value, on a cycle-by-cycle basis, for inserting into the nonce field, on the cycle-by-cycle basis, for computing the partial hash digest, on the cycle-by-cycle basis.

The at least one partial hash engine may be a plurality of partial hash engines. Each partial hash engine of the plurality of partial hash engines may be configured, on a cycle-by-cycle basis, to compute a respective partial hash digest of a respective final hash digest for a respective block header of the block candidate. Each partial hash engine of the plurality of partial hash engines may be further configured to generate a respective notification based on determining that the respective partial hash digest computed satisfies the criterion.

Each partial hash engine of the plurality of hash engines may be further configured to insert, on the cycle-by-cycle basis, a given nonce value into a nonce field of the respective block header, wherein the given nonce value inserted is from a respective unique range of nonce values of a total range of nonce values, and to compute, on the cycle-by-cycle basis, the respective partial hash digest.

In response to the respective notification generated, the controller may be further configured to generate the respective block header at the controller using a respective given nonce value. The respective given nonce value may have been inserted by a respective partial hash engine of the plurality of hash engines to compute the respective partial hash digest that satisfied the criterion. The given nonce value may be determined at the controller. Alternatively, the given nonce value may be received by the controller from the respective partial hash engine. In response to the respective notification generated, the controller may be further configured to activate the complete hash engine to compute, in its entirety, the final hash digest for the respective block header generated.

The controller may be further configured to be synchronized with each partial hash engine of the plurality of hash engines on the cycle-by-cycle basis and to determine the respective given nonce value as a function of a given cycle, associated with the respective notification generated, and a unique identifier, associated with the respective partial hash engine. The controller may be synchronized with each partial hash engine of the plurality of hash engines via at least one clock.

The controller may further include a counter. The controller may be further configured to vary a counter value of the counter, on the cycle-by-cycle basis, and to determine the respective given nonce value as a function of the counter value, in the given cycle, and the unique identifier.

The circuit may further comprise at least one respective wire configured to couple, communicatively, each respective partial hash engine of the at least one partial hash engine to the controller to enable each respective partial hash engine to communicate a respective notification to the controller. Each respective wire of the at least one respective wire may be a single respective wire. It should be understood, however, that each respective wire of the at least one respective wire is not limited to a single respective wire.

The controller may be further configured to communicate block header field information to the at least one partial hash engine for insertion into respective fields of the block header. The block header field information may include a version, previous block hash, merkle root, timestamp, representation of a target value, or a combination thereof. It should be understood, however, that the block header field information is not limited to the block header field information disclosed herein.

The controller may be further configured to communicate a nonce value to the at least one partial hash engine on a cycle-by-cycle basis. The at least one partial hash engine may be further configured to insert the block header information and the nonce value into respective fields of the block header on the cycle-by-cycle basis, to compute the partial digest, on the cycle-by-cycle basis.

The at least one partial hash engine may be further configured to generate a nonce value on a cycle-by-cycle basis, and to insert the nonce value and block header information into respective fields of the block header on the cycle-by-cycle basis, to compute the partial digest, on the cycle-by-cycle basis.

The at least one partial hash engine may be further configured to generate the nonce value as a function of a fixed value and a variable value and to vary the variable value on the cycle-by-cycle basis.

The at least one partial hash engine may be assigned a respective unique identifier. The fixed value may be the respective unique identifier assigned.

The at least one partial hash engine may include a counter. The variable value may be a counter value of the counter. The at least one partial hash engine may be further configured to reset the counter in response to a reset signal received from the controller.

The controller may be further configured to submit the final hash digest computed to a host processor, to effectuate the decision at the host processor for whether to submit the block candidate with the block header to the blockchain network.

The controller may be further configured to determine a difference between the final hash digest computed and a target value. The block header may include a representation of the target value. The controller may be further configured to submit the difference to a host processor, to effectuate the decision at the host processor for whether to submit the block candidate with the block header to the blockchain network.

The controller may be further configured to determine whether the final hash digest satisfies the target value. In an event the final hash digest satisfies the target value, the controller may be further configured to submit the block candidate with the block header to the blockchain network.

The controller may be further configured to convert the representation of the target value to the target value and to compare the final hash digest computed to the target value. In an event the final hash digest computed is less than or equal to the target value, the controller may be further configured to conclude that the final hash digest satisfies the target value.

The digital currency may be bitcoin. The block header may be a bitcoin block header. The circuit may be employed in an application-specific integrated circuit (ASIC). The ASIC may be a bitcoin mining application-specific integrated circuit (ASIC). It should be understood that the digital currency is not limited to bitcoin, the block header is not limited to a bitcoin block header, and that the circuit is not limited to being employed in a bitcoin mining ASIC.

According to another example embodiment, a method for use in mining digital currency in a blockchain network comprises computing a partial hash digest of a final hash digest for a block header of a block candidate by implementing a hash function, partially. The method further comprises generating a notification based on determining that the partial hash digest computed satisfies a criterion. The method further comprises, in response to generation of the notification, computing, in its entirety, the final hash digest for the block header by implementing the hash function, completely. The final hash digest is computed, in its entirety, to effectuate a decision for submission of the block candidate with the block header to the blockchain network for mining the digital currency.

Alternative method embodiments parallel those described above in connection with the example circuit embodiment.

According to another example embodiment, a controller for mining digital currency in a blockchain network comprises a complete hash engine. The complete hash engine is configured to implement a hash function, completely. The controller further comprises a notification interface. The controller is configured, in response to receiving a notification via the notification interface, to activate the complete hash engine to compute, in its entirety, a final hash digest for a block header. The notification is received from a partial hash engine configured to implement the hash function, partially, to compute a partial hash digest of the final hash digest. The final hash digest is computed by the controller to effectuate a decision for submission of the block candidate with the block header to the blockchain network for mining the digital currency.

According to another example embodiment, a partial hash engine for mining digital currency in a blockchain network comprises hashing logic. The hashing logic is configured to implement a hash function, partially, to compute a partial hash digest of a final hash digest for a block header of a block candidate. The partial hash engine further comprises a notification generator. The notification generator is configured to generate a notification based on determining that the partial hash digest computed satisfies a criterion. The partial hash engine further comprises a notification interface. The notification interface is configured to communicate the notification generated to a controller that is configured to activate a complete hash engine, in response to the notification generated, to compute, in its entirety, the final hash digest for the block header to effectuate a decision for submission of the block candidate with the block header to the blockchain network for mining the digital currency.

According to yet another example embodiment, an application-specific integrated circuit (ASIC) for mining digital currency in a blockchain network comprises a plurality of partial hash engines. Each partial hash engine of the plurality of partial hash engines is configured to (i) implement a hash function, partially, to compute a respective partial hash digest of a respective final hash digest for a respective block header of a block candidate and (ii) generate a respective notification based on determining that the respective partial hash digest computed satisfies a criterion. The ASIC further comprises a controller. The controller includes a complete hash engine configured to implement the hash function, completely. The controller is configured, in response to the respective notification generated, to activate the complete hash engine to compute, in its entirety, the respective final hash digest for the respective block header to effectuate a decision for submission of the block candidate with the respective block header to the blockchain network for mining the digital currency. The digital currency may be bitcoin, the block header may be a bitcoin block header, and the ASIC may be a bitcoin mining ASIC. It should be understood that the digital currency is not limited to bitcoin, the block header is not limited to a bitcoin block header, and the ASIC is not limited to a bitcoin mining ASIC.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
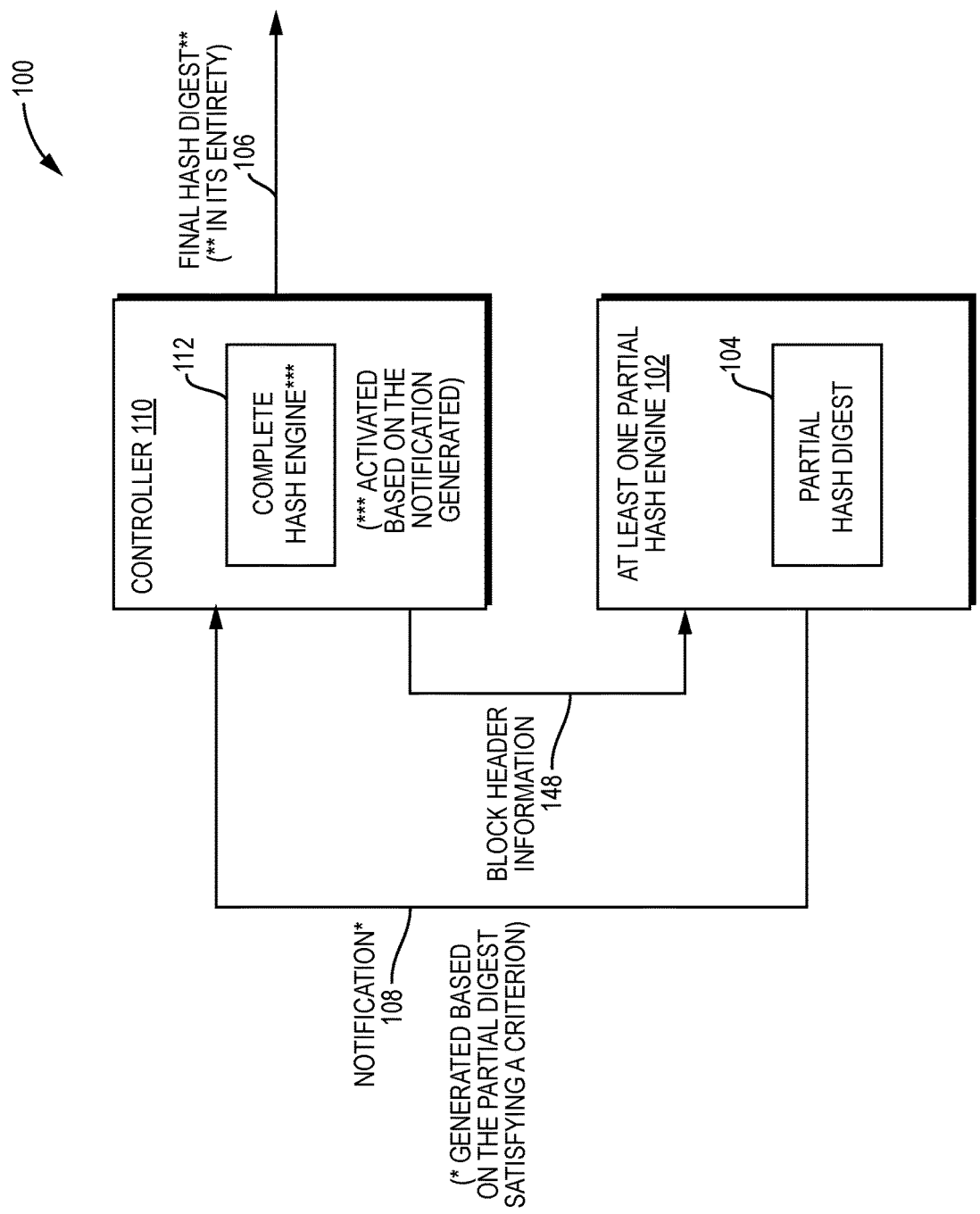
FIG. 1 is a block diagram of an example embodiment of a circuit for mining digital currency in a blockchain network.

A description of example embodiments follows.

It should be understood that the term "blockchain" as used herein includes all forms of electronic, computer-based, distributed ledgers. These include consensus-based blockchain and transaction-chain technologies, permissioned and un-permissioned ledgers, shared ledgers and variations thereof. While bitcoin may be referred to herein for the purpose of convenience and illustration, it should be noted that the disclosure is not limited to use with the bitcoin blockchain and alternative blockchain implementations and protocols fall within the scope of the present disclosure. Further, it should be understood that the present disclosure is not limited to bitcoin mining and that mining for other forms of digital currency fall within the scope of the present disclosure.

Each miner in a bitcoin blockchain consumes an amount of energy in its attempt to solve a proof-of-work function. As such, while the successful miner that solves the proof-of-work function may receive newly minted bitcoin and transaction fees, power consumption of the miner affects profitability. The proof-of-work function is to find a nonce to insert in a block header, such that the double hash of the block header results in a digest (i.e., cryptographic hash) with a large number of zero's. The block header has a 32-bit nonce field, such as disclosed further below with regard to FIG. 3. It should be understood, however, that the present disclosure is not limited to a bitcoin blockchain and that the nonce field is not limited to 32-bits.

According to an example embodiment, power consumption and area, that is, a number of hardware gates, used by an application-specific integrated circuit (ASIC) for solving the proof-of-work function may be reduced relative to a conventional ASIC that miners employ that may include multiple hash engines each configured to compute an entire final hash digest of a double hash of the block header, in parallel, each looking for the "magic" result, that is, a final hash digest that is less than or equal to a target value.

Bitcoin's difficulty target, that is, the target value, is a 256-bit number that is adjusted every 2016 blocks (~2 weeks) based on the time it took to mine the previous 2016 blocks. The difficulty method attempts to produce a block roughly every ten minutes and is proportionately modified by miners every two weeks to an amount of time higher or lower than an amount of time it took to mine the previous 2016 blocks. A higher difficulty target means blocks are easier to produce and a lower difficulty target means that they are harder to mine.

Proof-of-work is designed so that miners expend resources (hardware and electricity) to secure the network, which concurrently creates an incentive for miners to secure the network because their reward for mining is received directly in bitcoins and they have invested electricity and hardware into acquiring bitcoins. The difficulty adjustment plays the role of regulating the issuance of bitcoins into the ecosystem at a fixed and predetermined rate. When the bitcoin price rises, more miners are incentivized to join the network to take advantage of the profit margins, leading to an increase in the network's hash power. If there were no difficulty adjustment to make it harder to mine blocks at an increased hash power, then bitcoins would be issued at a continually faster pace than the predetermined ten minutes, making bitcoin susceptible to a rising stock-to-flow ratio that plagues inflationary fiat currencies and even scarce minerals like silver.

For instance, when a value of silver rises, mining companies are incentivized to mine more silver, increasing a supply of silver and deflating a price thereof. No matter how much hash power a bitcoin network aggregates, this problem will never occur because the difficulty target adjusts to make the issuance rate consistent despite more miners contributing computing power to solve proof-of-work.

A node in a bitcoin network is a powerful computer that runs bitcoin software and helps to keep bitcoin running by participating in the relay of information. Anyone can run a node for mining bitcoin in the bitcoin network. To run the node for mining bitcoin, a user simply downloads the bitcoin software (free) and leaving a certain port of the computer open. A drawback is that such mining consumes power and storage space. An example embodiment disclosed herein may be employed in circuitry of the node and reduces an amount of power consumption and area (e.g., a number of hardware gates) used for solving the proof-of-work function.

Mining nodes, also referred to interchangeably herein as miners, group outstanding transactions into a block and add the block to a blockchain, such as the blockchain 272 of FIG. 2, disclosed below. Miners are able to add the block by solving a complex mathematical puzzle, that is, the proof-of-work function that is part of the bitcoin program, and including the answer to the puzzle in the block. The puzzle that needs to be solved by the miner is to find a number that, when combined with the data in the block header and passed through a hash function, produces a result that is within a certain range. The number is called a "nonce," which is a concatenation of "number used once." In the case of bitcoin, the nonce is an integer between 0 and 4,294,967,295 (i.e., $2^{32}-1$).

The hash function makes it impossible to predict what the output will be. Miners guess the mystery number, that is, a nonce value for the nonce, and apply the hash function to the combination of that nonce value and other data in the block header. The resulting hash has to start with a pre-established number of zeroes. The predetermined number of zeros is reflected in the target value. There's no way of knowing which number for the nonce value will work, because two consecutive integers will give wildly varying results for the resulting hash.

The first miner to get a resulting hash within the desired range announces its victory to the rest of the network. All the other miners immediately stop work on that block and start trying to figure out the mystery number for a next block candidate. As a reward for its work, the victorious miner receives newly minted bitcoin. The costs of being a mining node are, however, considerable, not only because of the powerful hardware needed (with a faster processor than that of competitors, there is a better chance of finding the correct number before a competitor does), but also because of the large amount of electricity that running these processors consumes. An example embodiment reduces an amount of such electricity by reducing power and area (e.g., a number of hardware gates) of a circuit employed for solving the proof-of-work function, as disclosed further below.

A number of bitcoins awarded as a reward for solving the puzzle will decrease, for example, by halving every four years or so. The difficulty of the calculation (the required number of zeroes at the beginning of the target hash value) is adjusted frequently, so that it may take on average about ten minutes to process a block. Ten minutes is the amount of time thought to be necessary for a steady and diminishing flow of new coins until the maximum number of 21 million is reached, expected at some time in the year 2140.

Over the long-term, the issuance of bitcoins will never change even if the price raises to an astronomical sum. Since the increase in hash power cannot lead to more bitcoins being issued than what is predetermined, the collateral effect is that the security of the network increases by more miners joining the network. In the early days of bitcoin, when the difficulty requirement was lower due to less miners, the miners would group a number of transactions, take the Merkle root, use the current time as the timestamp, create the block header, then iterate through the nonce space—and they stood a decent chance of finding a nonce that, when combined with the rest of the information in the block header, produced a Secure Hash Algorithm ("SHA") hash that satisfied the difficulty requirement.

With the number of miners increasing, the difficulty requirement has increased. Miners may need to iterate through a range of nonce values and then try again, by changing something else in the block header (e.g., the timestamp), then iterate through the range of nonce values again in hopes of finding a nonce value that satisfies the difficulty requirement. This process repeats many times, until finally a miner finds the winning combination of header information and nonce value that produces a final hash (i.e., final hash digest) that satisfies the difficulty requirement. An example embodiment includes a circuit with reduced power consumption and area (e.g., a number of hardware gates) for implementing such a process. The circuit employs at least one partial hash engine and a controller that includes a complete hash engine, such as disclosed below with regard to FIG. 1.

FIG. 1 is a block diagram of an example embodiment of circuit 100 for mining digital currency (not shown) in a blockchain network (not shown). The circuit 100 has reduced power consumption and area (e.g., a number of hardware gates) relative to conventional circuits for mining digital currency, as disclosed further below. The circuit 100 may be used, for example, for mining bitcoin in a blockchain network, such as the bitcoin 256b that is mined by a first miner 200 in the blockchain network 270 of FIG. 2, disclosed below. It should be understood; however, that the circuit 100 is not limited for use in mining bitcoin and may be used for mining other digital currencies. Further, it should be understood that the circuit 100 is not limited to being used in the first miner 200 and/or in the blockchain network 270 of FIG. 2, disclosed below.

Figure 2:
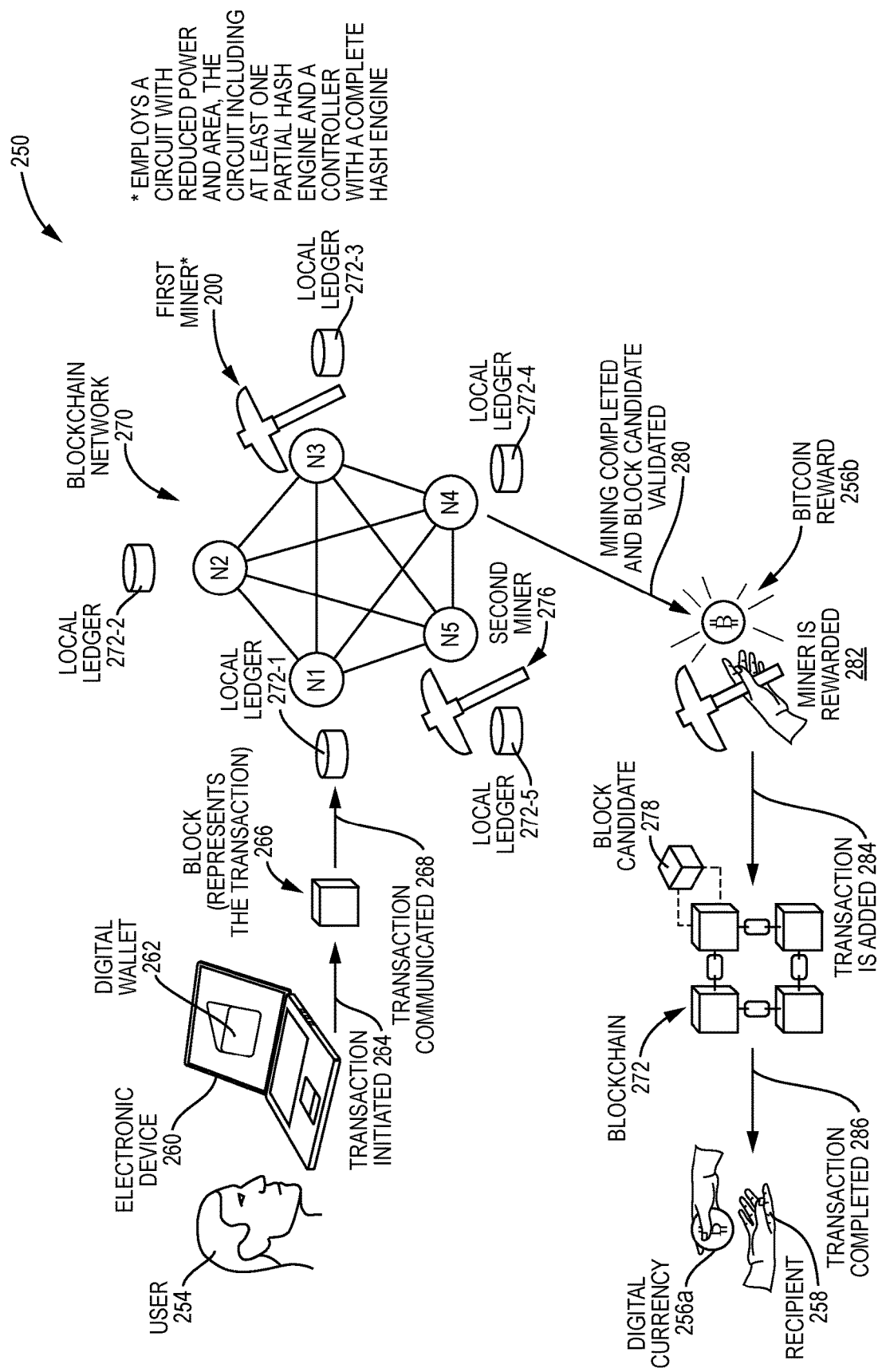
FIG. 2 is a block diagram of an example embodiment of a system that includes a blockchain network in which various embodiments of the present disclosure may be implemented.

FIG. 2 is a block diagram of an example embodiment of a system 250 that includes a blockchain network 270. The blockchain network 270 is a peer-to-peer network that includes a plurality of nodes, namely, node N1, node N2, Node N3, node N4, and node N5. It should be understood that a total number of nodes in the blockchain network 270 may be any total number of nodes and is not limited to five nodes. Further, such nodes may include any type of computing device(s) and may include a computer farm(s).

A blockchain 272 is distributed across the blockchain network 270. The blockchain 272 is a growing list of records, called blocks, which are linked using cryptography. Each block contains a cryptographic hash of the previous block, a timestamp, and transaction data, generally represented as a Merkle tree. By design, the blockchain 272 is resistant to modification. The blockchain 272 is a distributed ledger, each of the nodes N1, N2, N3, N4, and N5 has a local ledger, namely, the local ledger 272-1, local ledger 272-2, local ledger 272-3, local ledger 272-4, and local ledger 272-5, respectively, that is a respective copy of the distributed ledger, that is, the blockchain 272.

The blockchain network 270 has no central authority. The blockchain 272 is a shared and immutable ledger, the information stored on it is open for anyone and everyone to see. The blockchain 272 enables, for example, the digital currency 256a to be transferred from the user 254 to the recipient 258 in a fully automated and safe manner. The user 254 initiates the transaction process by creating a block 266. The block 266 is verified by the plurality of nodes N1, N2, N3, N4, and N5 in the blockchain network 270 before it can be added to the blockchain 272, enabling the transaction to complete.

For example, in the system 250, the user 254 initiates a transaction (not shown) to send the digital currency 256a to the recipient 258. The user 254 initiates the transaction via an electronic device 260 that may be a laptop computer, desktop computer, smartphone, or any other electronic computing device. In the example embodiment, the digital currency 256a is bitcoin and the transaction is a wire transfer. To initiate the wire transfer, the user 254 uses a digital wallet 262, that is, an application (i.e., app) installed on the electronic device 260. The digital wallet 262 creates the transaction that may include information regarding the user 254, an amount of the digital currency 256a to be transferred, and information associated with the recipient 258. The transaction is initiated 264 and communicated 268 to the blockchain network 270. For example, the transaction is represented as the block 266 that is broadcast to the nodes N1-N5.

In the example embodiment, node N3 is a first miner 200 and node N5 is a second miner 276. The miners, that is, the first miner 200 and the second miner 276 race to compute a proof-of-work for a block candidate 278 that includes the transaction represented by the block 266. According to the example embodiment, the second miner 276 employs the circuit 100 of FIG. 1, enabling the second miner to compute the proof-of-work for the block candidate 278 with reduced power and area (e.g., a number of hardware gates), as disclosed further below.

According to the Bitcoin protocol, the miner that successfully computes a valid proof-of-work for the block candidate 278 is entitled to add the block candidate 278 to the blockchain 272 causing new units of bitcoin to be generated as a reward. In addition, the successful miner may get paid any transaction fees that were attached to transactions that the successful miner had inserted into the block candidate 278.

The proof-of-work for the block candidate 278 is a nonce value (not shown) that, when inserted in a designated field in a block header (not shown) of the block candidate 278, causes a cryptographic hash value of the block candidate 278 to meet a certain difficulty target (not shown). Once mining is completed, the block candidate 278 and proof-of-work, that is, the block header with the nonce value, are sent to the whole blockchain network 270 so other nodes can validate it. After mining is completed and the block candidate validated 280, the miner that submitted the block candidate 278 with the valid proof-of-work is the miner that is rewarded. Each node in the blockchain network updates its local ledger with the transactions that the miner chose to include in the block candidate 278. All the transactions in the block candidate 272 are now confirmed by the blockchain network 270 and are virtually irreversible. The miner is rewarded 282 with bitcoin 256b and the block candidate 278 is added to the blockchain 272 and, as such, the transaction is added 284 to the blockchain 272. The transaction is completed 286 and the recipient 258 receives the digital currency 256a.

The power consumption of the successful miner affects profitability. No better approach than trial-and-error has yet been discovered for finding the valid nonce that provides the proof-of-work. According to an example embodiment, the first miner 200 employs an example embodiment of the circuit 100 of FIG. 1 to reduce power and area (e.g., a number of hardware gates) of the first miner 200, as disclosed below with reference to FIG. 1. The first miner 200 may be a mining farm with, for example, a plurality of mining application-specific integrated circuits (ASICs) each employing an example embodiment of the circuit 100, to reduce power consumption and area (e.g., a number of hardware gates) of the mining farm. It should be understood;

however, that the first miner 200 is not limited to a mining farm and may be a single computing device.

Referring back to FIG. 1, the circuit 100 comprises at least one partial hash engine 102 configured to implement a hash function (not shown), partially, to compute a partial hash digest 104 of a final hash digest 106 for a block header (not shown) of a block candidate (not shown), such as the block header 348 of the block 378 of FIG. 3, disclosed further below, that may be employed as the block candidate 278 of FIG. 2, disclosed above. The at least one partial hash engine 102 of FIG. 1 is further configured to generate a notification 108 based on determining that the partial hash digest 104 satisfies a criterion (not shown). The criterion may be that all bits of the partial hash digest 104 have a same value. It should be understood, however, that the criterion is not limited thereto.

The circuit 100 further comprises a controller 110. The controller 110 includes a complete hash engine 112 that is configured to implement the hash function, completely. In response to the notification 108, the controller 110 is configured to activate the complete hash engine 112 to compute, in its entirety, the final hash digest 106 for the block header to effectuate a decision (not shown) for submission of the block candidate with the block header to the blockchain network for mining the digital currency.

For example, the final hash digest 106 may be compared to a target value, a representation of which may be present in the block header, in order to determine whether or not to submit the block candidate with the block header to the blockchain network. Such comparison may be performed by the controller 110. Alternatively, the controller 110 may forward the final hash digest 106 to a host processor (not shown), enabling the host processor to evaluate whether the final hash digest satisfies the target value and determine whether or not the block candidate with the block header is to be submitted to the blockchain network. Such submission may be performed in an event the final hash digest 106 satisfies the target value, thereby confirming that the nonce value of the block header is viable proof-of-work for mining the digital currency.

According to an example embodiment, the at least one partial hash engine 102 is a plurality of partial hash engines, such as the plurality of partial hash engines 602 of FIG. 6, disclosed further below. The plurality of partial hash engines may each employ a respective unique range of nonce values of an entire nonce space (e.g., 2θ32). The plurality of partial hash engines computes the final hash digest 106, partially, in parallel, on a cycle-by-cycle basis. Each partial hash engine requires less hardware than the complete hash engine 112 because only a portion of the final hash digest 106 is being computed.

As such, power consumption is reduced relative to multiple hash engines each computing the final hash digest 106, in its entirety, in parallel, on the cycle-by-cycle basis. Each partial engine has a reduced gate count relative to a hash engine that computes the final hash digest 106, in its entirety, such as the complete hash engine 112. In the example embodiment, the complete hash engine 112 is dormant until a given partial hash engine is able to determine that a portion of the final hash digest 106, that is, the partial hash digest 104, satisfies a given criterion.

Each partial hash engine of the at least one partial hash engine 102 iteratively computes a respective partial hash digest, on the cycle-by-cycle basis, using nonce values from its respective unique range. According to an example embodiment, each partial hash engine computes 32 bits of an entire 256 bits of the entire final hash digest 106. It should be understood, however that each partial hash engine may compute more or less than 32 bits of the entire final hash digest 106 and that the entire final hash digest 106 is not limited to 256 bits. Since the at least one partial hash engine 102 computes a partial hash digest 104 that is less than the final hash digest 106, the at least one partial hash engine 102 employs less hardware gates relative to the complete hash engine 112 that computes the final hash digest 106, in its entirety. As such, each partial hash engine of the at least one partial hash engine 102 utilizes less power and area (e.g., hardware gates) relative to a hash engine that computes a hash digest in its entirety.

Each partial hash engine, such as the at least one partial hash engine 102, determines, on a cycle-by-cycle basis, whether its respective partial hash digest satisfies a criterion, such as all bits having a value of one or zero. For example, as disclosed above, in the example of bitcoin, a certain number of all 0s is necessary for finding the "magic" result. According to the example embodiment, the final hash digest 106 need not be computed in its entirety unless a given nonce value has been determined, by a given partial hash engine, to produce the partial hash digest 104 with at least a minimum number of bits of the final hash digest 106 being the same.

According to an example embodiment, the at least one partial hash engine 102 computes the partial hash digest 104 and, in an event the partial hash digest 104 satisfies a criterion, such as all 0s or all 1s, the at least one partial hash engine 102 generates a notification 108 that is sent to the controller 110. The controller 110, in turn, activates the complete hash engine 112 in response to receiving the notification 108, causing the complete hash engine 112 to compute the final hash digest 106, in its entirety. In this way, a number of times that the final hash digest 106 is computed, in its entirety, is reduced, enabling power consumption to be reduced compared to multiple complete hash engines (not shown) that compute the final hash digest 106, in its entirety, on the cycle-by-cycle basis.

The controller 110 and the at least one partial hash engine 102 may be synchronized, for example, via a common clock (not shown). The controller 110 may send block header information 148 to the at least one partial hash engine 102 for use in computing the partial hash digest 104. The block header information 148 may exclude the nonce value as the nonce value may be determined by the at least one partial hash engine 102, locally, on a cycle-by-cycle basis. It should be understood that such a nonce value is different for each partial hash engine of the at least one partial hash engine 102 in a given cycle. Further a respective nonce value is updated from cycle-to-cycle.

For example, the at least one partial hash engine 102 may employ a counter (not shown) that is set to a given value based on a reset signal (not shown) from the controller 110. The reset signal may be driven by the controller 110 in an event another miner in the blockchain network has solved the proof-of-work function. It should be understood that the reset signal may be driven by the controller 110 based on other events. The reset signal may be driven to cause each partial hash engine of the at least one partial hash engine 102 to set its nonce value to an initial nonce value that may be generated, for example, by a respective counter.

Each partial hash engine of the at least one partial hash engine 102 may increment the nonce value, on a cycle-by-cycle basis, for example, by incrementing a respective counter. Since each partial hash engine of the at least one partial hash engine 102 and the controller 110 are synchronized, the controller 110 can determine, for example, via its own counter (not shown), which nonce value is being used, in a given cycle, by a given partial hash engine of the at least one partial hash engine 102. Further, the controller 110, may be aware of the respective unique range of nonce values used by each partial hash engine of the at least one partial hash engine 102. The notification 108, provided by any given partial hash engine of the at least one partial hash engine 102, is provided to the controller 110 via a respective notification interface (not shown) that enables the controller 110 to identify which partial hash engine of the at least one partial hash engine 102 generated the notification 108.

According to an example embodiment, each partial hash engine of the at least one partial hash engine 102 may be assigned a respective identifier and a portion of a respective nonce value used by a respective partial hash engine may be configured to be the respective identifier. In this way, the controller 110 can determine which nonce value was used by a given partial hash engine in a given cycle for which the given partial hash engine generated the notification 102.

As such, the controller 110 can compute the final hash digest 106, in its entirety, using a same nonce value that the at least one partial hash engine 102 used to compute the partial hash digest 104 that satisfied the criterion for generating the notification 108. Alternatively, the controller 110 may send the at least one partial hash engine 102 a respective nonce value to use, on a cycle-by-cycle basis. As such, a respective nonce value used by a given partial hash engine of the at least one partial hash engine 102, whether generated locally at the given partial hash engine or at the controller, is known to the controller 110, on the cycle-by-cycle basis. Further because the controller 110 provides the block header information 148 to the at least one partial hash engine 102, such block header information is also known to the controller 110 for computing the final hash digest 106, in its entirety.

Employing a single instance of the complete hash engine 112 that computes the final hash digest 106, in its entirety, enables power consumption to be reduced compared to a design in which multiple hash engines each compute a respective final hash digest, in its entirety, cyclically. In an example embodiment, the final hash digest 106 is computed in response to the notification 108, instead of being computed, cyclically, thereby reducing power consumption of the circuit 110. The final hash digest 106 is computed, in its entirety, by the controller 110 to assess a quality thereof, that is, a difference between the final hash digest 106 and the target value, in order to determine whether or not the proof-of-work function has been solved. While the at least one partial hash engine 102 has determined that the partial hash digest 104 satisfies the criterion, it may be that the final hash digest 106, that includes the partial hash digest 104, does not, in its entirety, satisfy the target value.

Since the at least one partial hash engine 102 does not compute all of the digest bits, area of the at least one partial hash engine 102 is reduced relative to the complete hash engine 112, leading to a savings in power and area of the circuit 110. Further, an example embodiment of the circuit 110 may employ a respective single wire for communication of each respective notification 108 of a plurality of partial hash engines, thereby reducing a number of hardware signals for communicating respective notifications back to the controller 110 (also referred to interchangeably herein as a central controller).

As disclosed above, each partial hash engine of the at least one partial hash engine 102 has a reduced gate count relative to a respective gate count of the complete hash engine 112. A set of gates (not shown) of a plurality of gates (not shown) used by the hash function to compute the final hash digest 106, in its entirety, are not present in the at least one partial hash engine 102 due to deletion thereof by a place-and-route tool (not shown) that identified the set of gates as unemployed for computation of the partial hash digest 104.

The hash function may include a first hash function (not shown) that is configured to compute an initial hash digest (not shown) by hashing the block header, such as the block header 348 of FIG. 3, disclosed below. The hash function may further include a second hash function configured to compute the final hash digest 106 by hashing the initial hash digest computed. The first hash function may be a secure hash algorithm (SHA)-256 cryptographic hash function and the second hash function may be the SHA-256 cryptographic hash function. It should be understood that the first and second hash functions are not limited to the SHA-256 cryptographic hash function. The final hash digest 106 may have a first length of 256 bits. The partial hash digest 104 may have a second length of 32 bits. It should be understood, however, that the first length is not limited to 256 bits and the second length is not limited to 32 bits.

The first hash function may be associated with a first set of gates (not shown). The second hash function may be associated with a second set of gates (not shown). A partial set of gates (not shown), of a plurality of gates (not shown) that are used to compute the final hash digest 106, in its entirety, may not be present in the at least one partial hash engine 102 due to deletion thereof by the place-and-route tool that identified the set of gates as unemployed for computation of the partial hash digest 104. The partial set of gates may be from among the second set of gates.

The criterion may be that all bits of the partial hash digest 104 have a same value. It should be understood, however, that the criterion is not limited thereto. To determine whether the partial hash digest 104 satisfies the criterion, the at least one partial hash engine 102 may be further configured to perform a bitwise operation (not shown) on the partial hash digest 104 and generate the notification 108 based on a result (not shown) produced from the bitwise operation.

For example, the criterion may be that all bits of the partial hash digest 104 need to have a value of one to satisfy the criterion. As such, a bitwise AND operation could be employed to confirm same. It should be understood, however, that the criterion is not limited to all 1s and that the bitwise operation is not limited to the bitwise AND operation. In an example embodiment, the at least one partial hash engine 102 may be configured to drive a voltage level (not shown) of a single wire (not shown) to either a first voltage level or a second voltage level based on the result in order to generate the notification. It should be understood that generation is not limited thereto.

The circuit 100 may further comprise at least one respective wire (not shown) to couple, communicatively, each respective partial hash engine of the at least one partial hash engine 102 to the controller 110 to enable each respective partial hash engine to communicate a respective notification to the controller 110. Each respective wire of the at least one respective wire may be a single respective wire. It should be understood, however, that each respective wire of the at least one respective wire may include a plurality of wires. Further, it should be understood that the at least one respective wire may or may not couple the respective partial hash engine to the controller 110, directly. For example, at least one gate may be interposed therebetween in a communications path (not shown) between the controller 110 and the respective partial hash engine, wherein the communications path includes the at least one respective wire.

The controller 110 may be further configured to communicate the block header field information 148 to the at least one partial hash engine 102 for insertion into respective fields of the block header. The block header field information 148 may include a version, previous block hash, merkle root, timestamp, representation of a target value, or a combination thereof, such as disclosed further below with regard to FIG. 3. It should be understood, however, that the block header field information 148 is not limited to the block header field information disclosed herein.

The controller 110 may be further configured to communicate a nonce value (not shown) to the at least one partial hash engine 102 on a cycle-by-cycle basis. The at least one partial hash engine 102 may be further configured to insert the block header information 148 and the nonce value into respective fields of the block header on the cycle-by-cycle basis, to compute the partial digest 104, on the cycle-by-cycle basis.

The at least one partial hash engine 102 may be further configured to generate the nonce value on a cycle-by-cycle basis, and to insert the nonce value and block header information 148 into respective fields of the block header on the cycle-by-cycle basis, to compute the partial digest 104, on the cycle-by-cycle basis.

The at least one partial hash engine 102 may be further configured to generate the nonce value as a function of a fixed value (not shown) and a variable value (not shown) and to vary the variable value on the cycle-by-cycle basis. The at least one partial hash engine 102 may be assigned a respective unique identifier (not shown). The fixed value may be the respective unique identifier assigned. The at least one partial hash engine 102 may include a counter (not shown). The variable value may be a counter value (not shown) of the counter. The at least one partial hash engine 102 may be further configured to reset the counter in response to a reset signal (not shown) received from the controller 110.

The controller 110 may be further configured to submit the final hash digest 106 to a host processor (not shown), to effectuate the decision at the host processor for whether to submit the block candidate with the block header to the blockchain network. Alternatively, the controller 110 may be further configured to determine a difference between the final hash digest 106 and a target value (not shown) and to submit the difference to the host processor, to effectuate the decision at the host processor for whether to submit the block candidate with the block header to the blockchain network. Alternatively, the controller 110 may be further configured to determine whether the final hash digest 106 satisfies the target value. In an event the final hash digest 106 satisfies the target value, the controller may be further configured to submit the block candidate with the block header to the blockchain network.

The block header may include a representation of the target value. The controller 110 may be further configured to convert the representation of the target value to the target value and to compare the final hash digest 106 to the target value. In an event the final hash digest 106 is less than or equal to the target value, the controller 110 may be further configured to conclude that the final hash digest 106 satisfies the target value.

The at least one partial hash engine 102 may be a plurality of partial hash engines each configured to generate a nonce value, on a cycle-by-cycle basis, and to change the nonce value per cycle. Each partial hash engine may be configured to insert, on the cycle-by-cycle basis, the nonce value into a block header of a block candidate and to generate a respective partial hash digest 104 for the block header, such as the block header 348 of the block 378 of FIG. 3, disclosed below.

Figure 3:
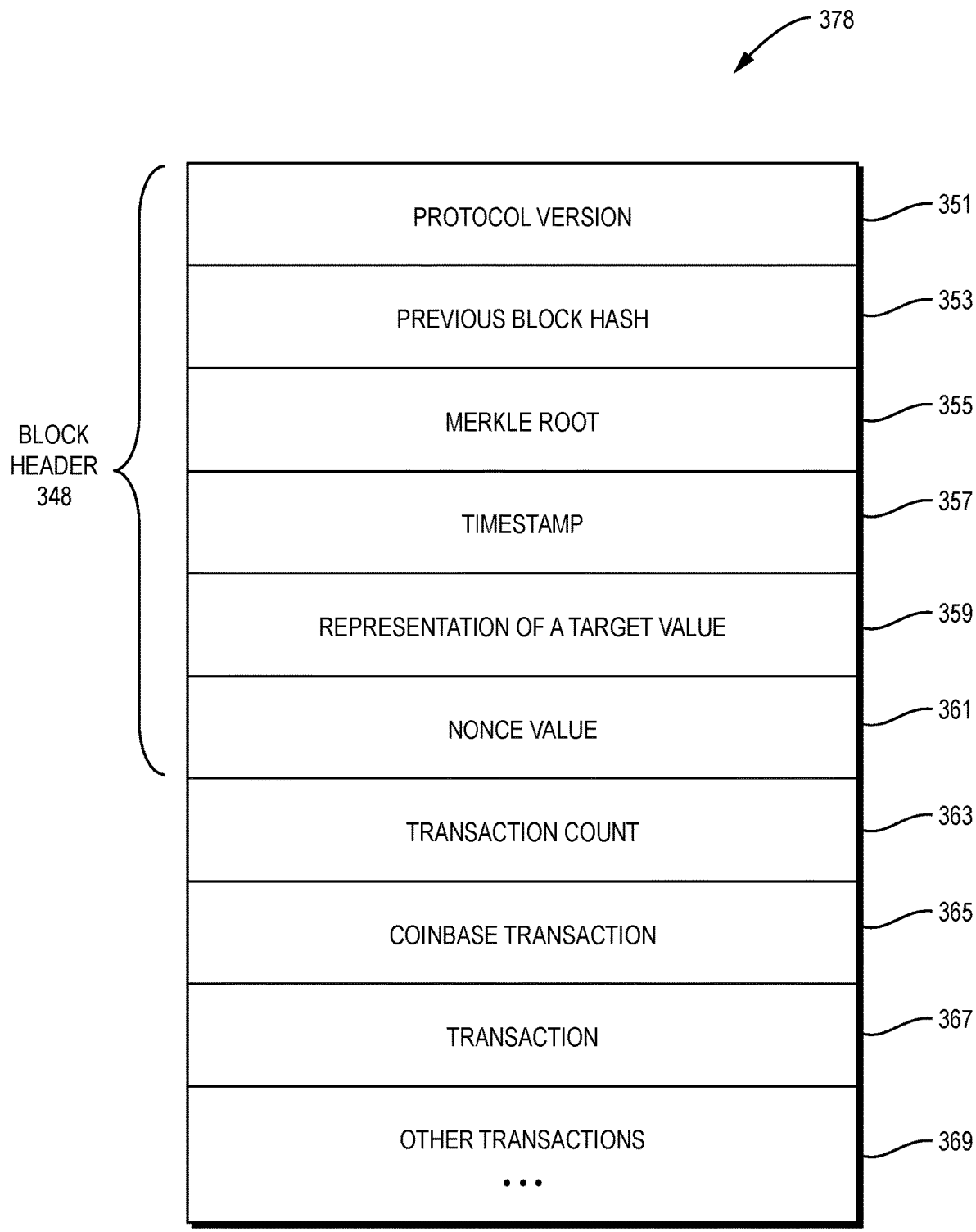
FIG. 3 is an example embodiment of a prior art format of block header of a block.

FIG. 3 is an example embodiment of a prior art format of block header 348 of a block 378. The prior art format is for a bitcoin block header. The block 378 includes the block header 348 that is followed by the transactions that go into the block 378. The block 378 includes a transaction count 363 of the transactions. The first transaction of the transactions is a coinbase transaction 365 that grants the mining reward to the miner, such as either the first miner 200 or the second miner 276 of FIG. 2, disclosed above, that successfully provides the proof-of-work. The remaining transactions are standard Bitcoin transactions that include, for example, the transaction 367 and any other transaction 369. The transaction 367 may be, for example, the transaction that is initiated by the user 254, as disclosed above with regard to FIG. 2.

The block 378 may be employed as the block candidate 278 of FIG. 2, disclosed above. The bitcoin block header 348 includes a handful of fields that describe the block 378. It should be understood that the block header 348 is not limited to those handful of fields. A first field in the block header 348 is for the protocol version 351 and is followed by a field for the hash of the previous block in the blockchain, that is, the previous block hash 353. The previous block hash 353 ensures that all the blocks form an unbroken sequence in the blockchain and is followed by a field for the Merkle root 355. The Merkle root 355 is a special hash of all the transactions in the block 378 and ensures that transactions that are part of the block 378 cannot be changed. Next is a field for a timestamp 357 of the block 378, followed by a representation of a target value 359.

Figure 4:
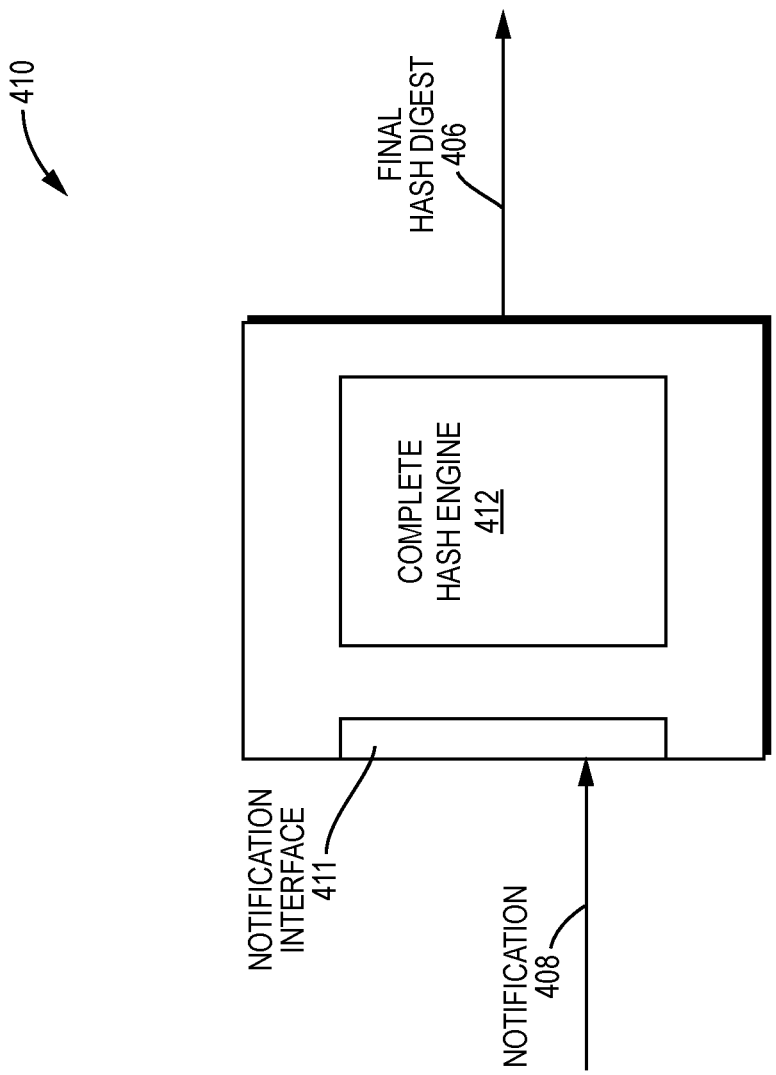
FIG. 4 is a block diagram of an example embodiment of a controller for mining digital currency in a blockchain network.

The representation of the target value 359 is a set of bits that represent the mining difficulty value, also referred to interchangeably herein as the target or target value. The representation of the target value 359 may be a compact format of the target based on a floating-point encoding using, for example, 3 bytes mantissa, the leading byte as an exponent (where only the 5 lowest bits are used), and its base may be 256. It should be understood, however, that the representation is not limited to the floating-point encoding. As such, the representation of the target value 359 may be converted to derive the actual target value, that is, a hash value that is the mining difficulty value. Following the field for the representation of the target value 359 is a field for the nonce value 361. The nonce value 361 is an arbitrary value that is changed on each hash attempt of the block header 348 to provide a hash value that is less than or equal to the actual target value. If the hash value starts with enough zeros, for example, the block is successfully mined, that is, a valid proof-of-work has been found and may be submitted to peers in the blockchain network for validation. Referring back to FIG. 1, the controller 110 generates the final hash digest 106, in its entirety, to be evaluated in order to determine whether the proof-of-work has been found. FIG. 4, disclosed below, discloses an example embodiment of the controller 110 of FIG. 1.

FIG. 4 is a block diagram of an example embodiment of a controller 410 for mining digital currency in a blockchain network, such as the blockchain network 270 of FIG. 2, disclosed above. The controller 410 comprises a complete hash engine 412 configured to implement a hash function (not shown), completely. The controller 410 further comprises a notification interface 441. In response to receiving a notification 408 via the notification interface 411, the controller 410 is configured to activate the complete hash engine 412 to compute, in its entirety, a final hash digest 406 for a block header (not shown).

The notification 408 is received from a partial hash engine (not shown) that is configured to implement the hash function, partially, to compute a partial hash digest (not shown) of the final hash digest 406. The controller 410 may be located at a location that is remote relative to a location of the partial hash engine. For example, the partial hash engine and controller 410 may not be located within a same chip or may not be located on a same circuit board. According to an example embodiment, the notification 408 may be received from a network (not shown) via the notification interface 411. For example, the partial hash engine and the controller 410 may be located in separate electronic computing devices that are communicatively coupled via the network. In an example embodiment, the notification 408 includes a nonce value used by the partial hash engine to compute the partial hash digest that satisfied the criterion.

The final hash digest 406 is computed by the controller 410 to effectuate a decision for submission of the block candidate with the block header to the blockchain network for mining the digital currency. Computation of the final hash digest 406, in its entirety, is performed based on receiving the notification 408 from the partial hash engine. An example embodiment of such a partial hash engine is disclosed above, with regard to FIG. 1, and below, with regard to FIG. 5.

Figure 5:
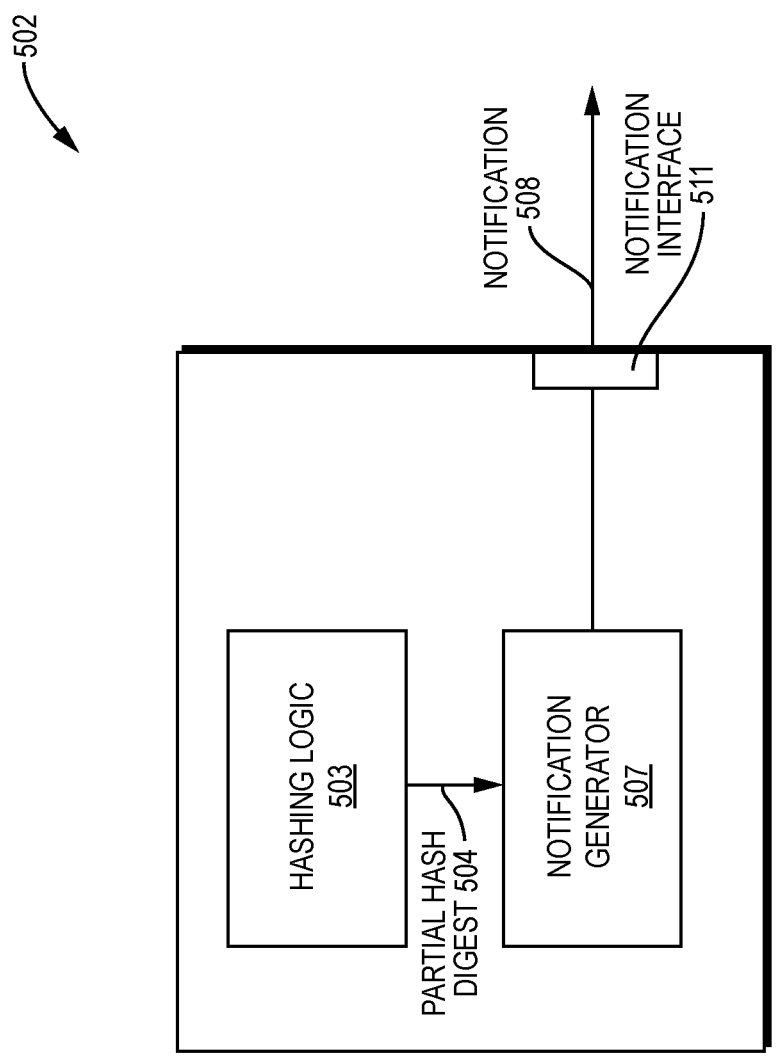
FIG. 5 is a block diagram of an example embodiment of a partial hash engine for mining digital currency in a blockchain network.

FIG. 5 is a block diagram of an example embodiment of a partial hash engine 502 for mining digital currency in a blockchain network. The partial hash engine 502 comprises hashing logic 503 configured to implement a hash function (not shown), partially, to compute a partial hash digest 504 of a final hash digest for a block header of a block candidate. The partial hash engine 502 further comprises a notification generator 507. The notification generator 507 is configured to generate a notification 508 based on determining that the partial hash digest 504 computed satisfies a criterion (not shown).

The partial hash engine 502 further comprises a notification interface 511 configured to communicate the notification 508 generated to a controller, such as the controller 110 of FIG. 1 or the controller 410 if FIG. 4, disclosed above. The controller may be located at a location that is remote relative to a location of the partial hash engine 502. For example, the partial hash engine 502 and controller may not be located within a same chip or may not be located on a same circuit board. According to an example embodiment, the notification 508 may be communicated via the notification interface 511 to the controller via a network (not shown). For example, the partial hash engine 502 and the controller may be located in separate electronic computing devices that are communicatively coupled via the network. In an example embodiment, the notification 508 includes a nonce value used by the partial hash engine to compute the partial hash digest that satisfied the criterion. The controller is configured to activate a complete hash engine (not shown), in response to the notification 508, to compute, in its entirety, the final hash digest for the block header to effectuate a decision for submission of the block candidate with the block header to the blockchain network for mining the digital currency. The example embodiment of the partial hash engine 502 and the controller 410, disclosed above, may be employed as the at least one partial hash engine 102 and controller 110 of the circuit 100 of FIG. 1, disclosed above. According to an example embodiment, the circuit 100 may be an application-specific integrated circuit (ASIC), such as the ASIC 600 of FIG. 6, disclosed below.

Figure 6:
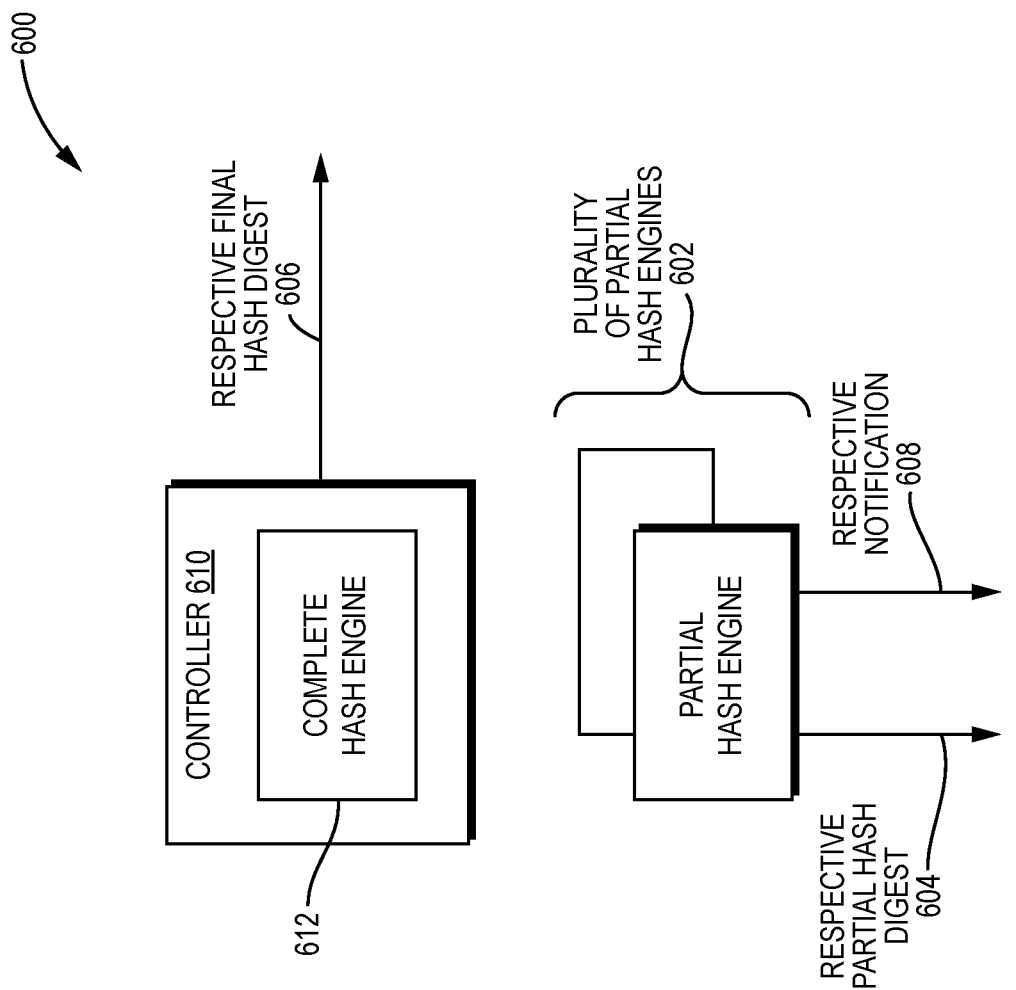
FIG. 6 is a block diagram of an example embodiment of an application-specific integrated circuit (ASIC) for mining digital currency in a blockchain network.

FIG. 6 is a block diagram of an example embodiment of an ASIC 600 for mining digital currency in a blockchain network. The ASIC 600 comprises a plurality of partial hash engines 600. Each partial hash engine of the plurality of hash engines 600 is configured to (i) implement a hash function (not shown), partially, to compute a respective partial hash digest 604 of a respective final hash digest 606 for a respective block header of a block candidate and (ii) generate a respective notification 608 based on determining that the respective partial hash digest 604 computed satisfies a criterion.

The ASIC 600 further comprises a controller 610 including a complete hash engine 612 configured to implement the hash function, completely. The controller 610 is configured, in response to the respective notification 604 generated, to activate the complete hash engine 612 to compute, in its entirety, the respective final hash digest 606 for the respective block header to effectuate a decision for submission of the block candidate with the respective block header to the blockchain network for mining the digital currency.

Each partial hash engine of the plurality of hash engines 602 may be assigned a respective unique range (not shown) of nonce values (not shown), of a total range (e.g., 2^32) of nonce values, for generating a nonce value, on a cycle-by-cycle basis, for inserting into a nonce field of the block header, such as the nonce field 361 of FIG. 3, disclosed above, on the cycle-by-cycle basis, for computing the partial hash digest 104, on the cycle-by-cycle basis.

Each partial hash engine of the plurality of partial hash engines 602 may be configured, on the cycle-by-cycle basis, to compute a respective partial hash digest 604 of a respective final hash digest for a respective block header of the block candidate, and to generate a respective notification 608 based on determining that the respective partial hash digest 604 computed satisfies the criterion.

Each partial hash engine of the plurality of hash engines 602 may be further configured to insert, on the cycle-by-cycle basis, a given nonce value into a nonce field of the respective block header, wherein the given nonce value inserted is from a respective unique range of nonce values of a total range of nonce values, and to compute, on the cycle-by-cycle basis, the respective partial hash digest 604.

In response to the respective notification 608 generated, the controller 610 may be further configured to generate the respective block header at the controller 610 using a respective given nonce value. The respective given nonce value may have been inserted by a respective partial hash engine of the plurality of hash engines 602 to compute the respective partial hash digest 604 that satisfied the criterion. In response to the respective notification 608 generated, the controller 610 may be further configured to activate the complete hash engine 612 to compute, in its entirety, the respective final hash digest 606 for the respective block header generated.

The controller 610 may be further configured to be synchronized with each partial hash engine of the plurality of hash engines 602 on the cycle-by-cycle basis and to determine the respective given nonce value as a function of a given cycle, associated with the respective notification generated, and a unique identifier, associated with the respective partial hash engine.

The controller 610 may further include a counter(s) (not shown). The controller 610 may be further configured to vary a counter value(s) of the counter(s), on the cycle-by-cycle basis, and to determine the respective given nonce value as a function of the counter value, in the given cycle, and the unique identifier.

Figure 7:
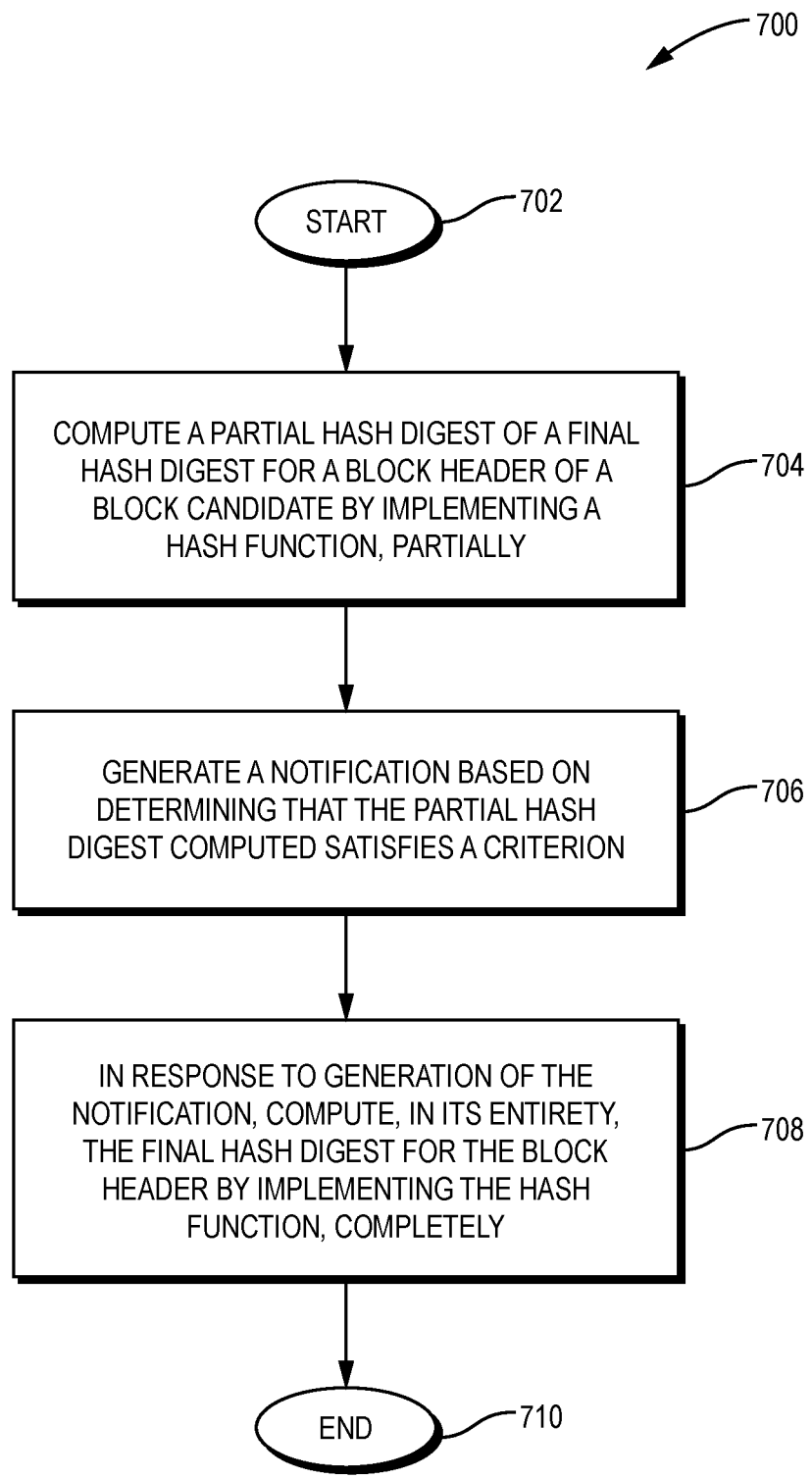
FIG. 7 is a flow diagram of an example embodiment of a method for mining digital currency in a blockchain network.

FIG. 7 is a flow diagram 700 of an example embodiment of a method for mining digital currency in a blockchain network. The method begins (702) and computes a partial hash digest of a final hash digest for a block header of a block candidate by implementing a hash function, partially (704). The method generates a notification based on determining that the partial hash digest computed satisfies a criterion (706). In response to generation of the notification, the method computes, in its entirety, the final hash digest for the block header by implementing the hash function, completely, the final hash digest computed, in its entirety, to effectuate a decision for submission of the block candidate with the block header to the blockchain network for mining the digital currency (708) and the method thereafter ends (710) in the example embodiment.

Determining whether the partial hash digest satisfies the criterion may include performing a bitwise operation on the partial hash digest and generating the notification based on a result produced from the bitwise operation.

Generating the notification may include driving a voltage level of a single wire to either a first voltage level or a second voltage level based on the result.

The method may further comprise employing a unique range of nonce values, of a total range of nonce values, for selecting a nonce value, on a cycle-by-cycle basis, for inserting into a nonce field of the block header, on the cycle-by-cycle basis, for computing the partial hash digest, on the cycle-by-cycle basis.

The method may further comprise, on the cycle-by-cycle basis, computing a respective partial hash digest of a respective final hash digest for a respective block header of the block candidate and generating a respective notification based on determining that the respective partial hash digest computed satisfies the criterion.

The method may further comprise inserting, on the cycle-by-cycle basis, a given nonce value into a nonce field of the respective block header, wherein the given nonce value inserted is from a respective unique range of nonce values of a total range of nonce values. The method may further comprise computing, on the cycle-by-cycle basis, the respective partial hash digest.

In response to the respective notification generated, the method may further comprise generating the respective block header using a respective given nonce value, the respective given nonce value used to compute the respective partial hash digest that satisfied the criterion, and computing, in its entirety, the final hash digest for the respective block header generated.

The method may further comprise determining the respective given nonce value as a function of a given cycle, associated with the respective notification generated, and a unique identifier, associated with a partial hash engine.

The method may further comprise varying a counter value of a counter on the cycle-by-cycle basis and determining the respective given nonce value as a function of the counter value, in the given cycle, and the unique identifier.

The method may further comprise communicating block header field information for insertion into respective fields of the block header, wherein the block header field information includes a version, previous block hash, merkle root, timestamp, representation of a target value, or a combination thereof.

The method may further comprise communicating a nonce value on a cycle-by-cycle basis and inserting the block header information and the nonce value into respective fields of the block header on the cycle-by-cycle basis, to compute the partial digest, on the cycle-by-cycle basis.

The method may further comprise generating a nonce value on a cycle-by-cycle basis, and inserting the nonce value generated and the block header information into respective fields of the block header on the cycle-by-cycle basis, to compute the partial digest, on the cycle-by-cycle basis.

The method may further comprise generating the nonce value, as a function of a fixed value and a variable value, and varying the variable value on the cycle-by-cycle basis.

The method may further comprise assigning a respective unique identifier to at least one partial hash engine, wherein the fixed value is the respective unique identifier assigned.

The variable value may be a counter value of a counter and the method may further comprise resetting the counter in response to a reset signal.

The method may further comprise submitting the final hash digest computed to a host processor, to effectuate the decision at the host processor for whether to submit the block candidate with the block header to the blockchain network.

The method may further comprise determining a difference between the final hash digest computed and a target value and submitting the difference to a host processor, to effectuate the decision at the host processor for whether to submit the block candidate with the block header to the blockchain network.

The method may further comprise determining whether the final hash digest satisfies a target value and, in an event the final hash digest satisfies the target value, the method may further comprise submitting the block candidate with the block header to the blockchain network, the block header including a representation of the target value. The method may further comprise converting the representation of the target value to the target value, comparing the final hash digest computed to the target value and, in an event the final hash digest computed is less than or equal to the target value, concluding that the final hash digest satisfies the target value. An example embodiment of the method may be implemented via the computer software instructions 810 and data 812 disclosed below with regard to FIG. 8.

Figure 8:
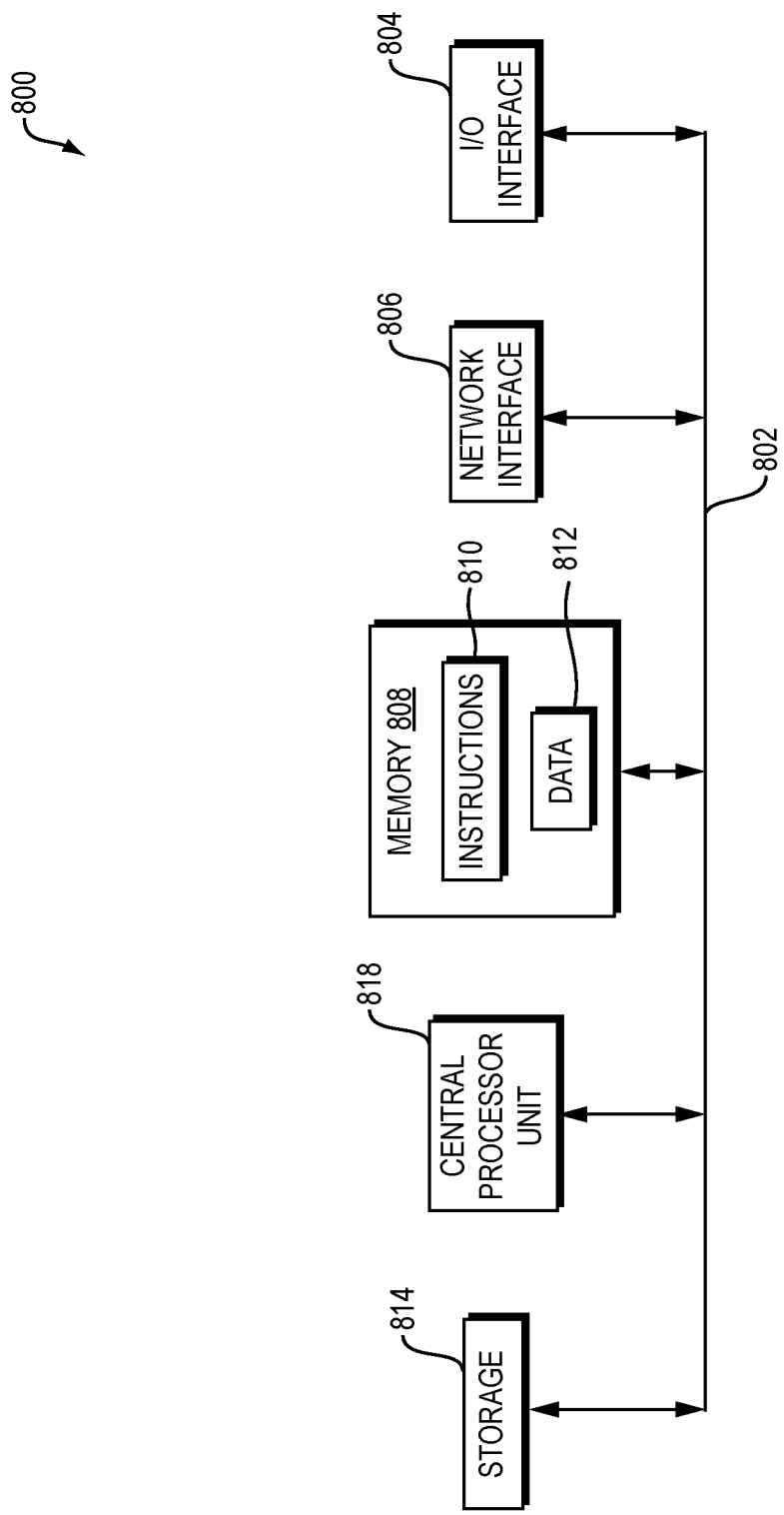
FIG. 8 is a block diagram of an example internal structure of a computer in which various embodiments of the present disclosure may be implemented.

FIG. 8 is a block diagram of an example of the internal structure of a computer 800 in which various embodiments of the present disclosure may be implemented. The example embodiment may be employed within a node of blockchain network, such as disclosed above with regard to FIG. 2. The computer 800 contains a system bus 802, where a bus is a set of hardware lines used for data transfer among the components of a computer or processing system. The system bus 802 is essentially a shared conduit that connects different elements of a computer system (e.g., processor, disk storage, memory, input/output ports, network ports, etc.) that enables the transfer of information between the elements. Coupled to the system bus 802 is an I/O device interface 804 for connecting various input and output devices (e.g., keyboard, mouse, displays, printers, speakers, etc.) to the computer 800.

Memory 808 provides volatile storage for computer software instructions 810 and data 812 that may be used to implement embodiments of the present disclosure. Disk storage 814 provides non-volatile storage for computer software instructions 810 and data 812 that may be used to implement embodiments of the present disclosure. For example, a central processor unit 818 is also coupled to the system bus 802 and provides for the execution of computer instructions. According to an example embodiment, the central processor unit 818 may serve as a host processor, disclosed above.

Further example embodiments disclosed herein may be configured using a computer program product; for example, controls may be programmed in software for implementing example embodiments. Further example embodiments may include a non-transitory computer-readable medium that contains instructions that may be executed by a processor, and, when loaded and executed, cause the processor to complete methods described herein. It should be understood that elements of the block and flow diagrams may be implemented in software or hardware, such as via one or more arrangements of circuitry of FIG. 8, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit comprising:
    at least one partial hash engine configured to (i) implement a hash function, partially, to compute a partial hash digest of a final hash digest for a block header of a block candidate for submission to a blockchain network and (ii) generate a notification based on the partial hash digest computed; and
    a complete hash engine configured to implement the hash function, completely and, in response to the notification generated, compute, in its entirety, the final hash digest for the block header of the block candidate for the submission.

2. The circuit of claim 1, wherein the at least one partial hash engine is a plurality of partial hash engines.

3. The circuit of claim 1, wherein each partial hash engine of the at least one partial hash engine has a reduced gate count relative to a respective gate count of the complete hash engine.

4. The circuit of claim 1, wherein a set of gates of a plurality of gates used by the hash function to compute the final hash digest, in its entirety, are not present in the at least one partial hash engine due to deletion thereof by a place-and-route tool that identified the set of gates as unemployed for computation of the partial hash digest.

5. The circuit of claim 1, wherein the hash function includes:
    a first hash function configured to compute an initial hash digest by hashing the block header; and
    a second hash function configured to compute the final hash digest by hashing the initial hash digest computed.

6. The circuit of claim 5, wherein the first hash function is a secure hash algorithm (SHA)-256 cryptographic hash function and wherein the second hash function is the SHA-256 cryptographic hash function.

7. The circuit of claim 5, wherein:
    the first hash function is associated with a first set of gates;
    the second hash function is associated with a second set of gates;
    a partial set of gates, of a plurality of gates used to compute the final hash digest, in its entirety, are not present in the at least one partial hash engine due to deletion thereof by a place-and-route tool;
    the partial set of gates deleted were identified by the place-and-route tool as unemployed for computation of the partial hash digest; and
    the partial set of gates are from among the second set of gates.

8. The circuit of claim 1, wherein the final hash digest has a first length of 256 bits and wherein the partial hash digest has a second length of 32 bits.

9. The circuit of claim 1, wherein the at least one partial hash engine is further configured to generate the notification based on all bits of the partial hash digest having a same value.

10. The circuit of claim 1, wherein the at least one partial hash engine is further configured to:
    perform a bitwise operation on the partial hash digest; and
    generate the notification based on a result produced from the bitwise operation.

11. The circuit of claim 10, wherein the at least one partial hash engine is configured to drive a voltage level of a single wire to either a first voltage level or a second voltage level based on the result in order to generate the notification.

12. The circuit of claim 1, wherein:
    the at least one partial hash engine is a plurality of partial hash engines;
    the block header includes a nonce field; and
    each partial hash engine of the plurality of hash engines is assigned a respective unique range of nonce values, of a total range of nonce values, for selecting a nonce value, on a cycle-by-cycle basis, for inserting into the nonce field, on the cycle-by-cycle basis, for computing the partial hash digest, on the cycle-by-cycle basis.

13. The circuit of claim 1, wherein the at least one partial hash engine is a plurality of partial hash engines and wherein each partial hash engine of the plurality of partial hash engines is configured, on a cycle-by-cycle basis, to:
    compute a respective partial hash digest of a respective final hash digest for a respective block header of the block candidate; and
    generate a respective notification based on determining that the respective partial hash digest computed satisfies a criterion.

14. The circuit of claim 13, wherein each partial hash engine of the plurality of hash engines is further configured to:
    insert, on the cycle-by-cycle basis, a nonce value into a nonce field of the respective block header, wherein the nonce value inserted is from a respective unique range of nonce values of a total range of nonce values; and compute, on the cycle-by-cycle basis, the respective partial hash digest.

15. The circuit of claim 14, further comprising a controller, the controller including the complete hash engine, and wherein, in response to the respective notification generated, the controller is configured to:
   generate the respective block header at the controller using a respective nonce value, the respective nonce value having been inserted by a respective partial hash engine of the plurality of hash engines to compute the respective partial hash digest that satisfied the criterion; and
   activate the complete hash engine to compute, in its entirety, the final hash digest for the respective block header generated.

16. The circuit of claim 15, wherein the controller is further configured to:
   be synchronized with each partial hash engine of the plurality of hash engines on the cycle-by-cycle basis; and
   to determine the respective nonce value as a function of a cycle, associated with the respective notification generated, and a unique identifier, associated with the respective partial hash engine.

17. The circuit of claim 16, wherein the controller further includes a counter and wherein the controller is further configured to:
   vary a counter value of the counter on the cycle-by-cycle basis; and
   determine the respective nonce value as a function of the counter value, in the cycle, and the unique identifier.

18. The circuit of claim 1, wherein the circuit further comprises a controller and at least one respective wire to communicatively couple each respective partial hash engine of the at least one partial hash engine to the controller to enable each respective partial hash engine to communicate a respective notification to the controller, the controller including the complete hash engine.

19. The circuit of claim 18, wherein each respective wire of the at least one respective wire is a single respective wire.

20. The circuit of claim 1, further comprising a controller, wherein the controller includes the complete hash engine, wherein the controller is configured to communicate block header field information to the at least one partial hash engine for insertion into respective fields of the block header, and wherein the block header field information includes a version, previous block hash, merkle root, timestamp, representation of a target value, or a combination thereof.

21. The circuit of claim 20, wherein the controller is further configured to communicate a nonce value to the at least one partial hash engine on a cycle-by-cycle basis and wherein the at least one partial hash engine is further configured to insert the block header information and the nonce value into respective fields of the block header on the cycle-by-cycle basis, to compute the partial digest, on the cycle-by-cycle basis.

22. The circuit of claim 20, wherein the at least one partial hash engine is further configured to generate a nonce value on a cycle-by-cycle basis, and to insert the nonce value and block header information into respective fields of the block header on the cycle-by-cycle basis, to compute the partial digest, on the cycle-by-cycle basis.

23. The circuit of claim 22, wherein the at least one partial hash engine is further configured to:
   generate the nonce value as a function of a fixed value and a variable value; and
   vary the variable value on the cycle-by-cycle basis.

24. The circuit of claim 23, wherein the at least one partial hash engine is assigned a respective unique identifier and wherein the fixed value is the respective unique identifier assigned.

25. The circuit of claim 23, wherein the at least one partial hash engine includes a counter, wherein the variable value is a counter value of the counter, and wherein the at least one partial hash engine is further configured to reset the counter in response to a reset signal received from the controller.

26. The circuit of claim 1, further comprising a controller, wherein the controller includes the complete hash engine, wherein the controller is configured to submit the final hash digest computed to a host processor, to effectuate a decision at the host processor for whether to submit the block candidate with the block header to the blockchain network.

27. The circuit of claim 1, further comprising a controller, wherein the controller includes the complete hash engine, and wherein the controller is configured to:
   determine a difference between the final hash digest computed and a target value; and
   submit the difference to a host processor, to effectuate a decision at the host processor for whether to submit the block candidate with the block header to the blockchain network, the block header including a representation of the target value.

28. The circuit of claim 1, further comprising a controller, wherein the controller includes the complete hash engine, and wherein the controller is further configured to:
   determine whether the final hash digest satisfies a target value; and
   in an event the final hash digest satisfies the target value, submit the block candidate with the block header to the blockchain network, the block header including a representation of the target value.

29. The circuit of claim 28, wherein the controller is further configured to:
   convert the representation of the target value to the target value;
   compare the final hash digest computed to the target value; and
   in an event the final hash digest computed is less than or equal to the target value, conclude that the final hash digest computed satisfies the target value.

30. The circuit of claim 1, wherein the block header is a bitcoin block header and wherein the circuit is employed in a bitcoin mining application-specific integrated circuit (ASIC).

31. The circuit of claim 1, wherein the circuit is an ASIC.

32. A method comprising:
   computing a partial hash digest of a final hash digest for a block header of a block candidate for submission to a blockchain network by implementing a hash function, partially;
   generating a notification based on the partial hash digest computed; and
   in response to the notification generated, computing, in its entirety, the final hash digest for the block header of the block candidate for the submission by implementing the hash function, completely.

33. The method of claim 32, wherein the hash function includes:
   a first hash function for computing an initial hash digest by hashing the block header; and
   a second hash function for computing the final hash digest by hashing the initial hash digest computed.

34. The method of claim 33, wherein the first hash function is a secure hash algorithm (SHA)-256 cryptographic hash function and wherein the second hash function is the SHA-256 cryptographic hash function.

35. The method of claim 32, wherein the final hash digest has a first length of 256 bits and wherein the partial hash digest has a second length of 32 bits.

36. The method of claim 32, wherein the generating is based on all bits of the partial hash digest having a same value.

37. The method of claim 32, further comprising:
performing a bitwise operation on the partial hash digest; and
generating the notification based on a result produced from the bitwise operation.

38. The method of claim 37, wherein generating the notification includes driving a voltage level of a single wire to either a first voltage level or a second voltage level based on the result.

39. The method of claim 32, further comprising:
employing a unique range of nonce values, of a total range of nonce values, for selecting a nonce value, on a cycle-by-cycle basis, for inserting into a nonce field of the block header, on the cycle-by-cycle basis, for computing the partial hash digest, on the cycle-by-cycle basis.

40. The method of claim 32, further comprising, on a cycle-by-cycle basis:
computing a respective partial hash digest of a respective final hash digest for a respective block header of the block candidate; and
generating a respective notification based on determining that the respective partial hash digest computed satisfies a criterion.

41. The method of claim 40, further comprising:
inserting, on the cycle-by-cycle basis, a nonce value into a nonce field of the respective block header, wherein the nonce value inserted is from a respective unique range of nonce values of a total range of nonce values; and
computing, on the cycle-by-cycle basis, the respective partial hash digest.

42. The method of claim 41, further comprising, in response to the respective notification generated:
generating the respective block header using a respective nonce value, the respective nonce value used to compute the respective partial hash digest that satisfied the criterion; and
computing, in its entirety, the final hash digest for the respective block header generated.

43. The method of claim 42, further comprising:
determining the respective nonce value as a function of a cycle, associated with the respective notification generated, and a unique identifier, associated with a partial hash engine.

44. The method of claim 43, further comprising:
varying a counter value of a counter on the cycle-by-cycle basis; and
determining the respective nonce value as a function of the counter value, in the cycle, and the unique identifier.

45. The method of claim 32, further comprising communicating block header field information for insertion into respective fields of the block header and wherein the block header field information includes a version, previous block hash, merkle root, timestamp, representation of a target value, or a combination thereof.

46. The method of claim 45, further comprising communicating a nonce value on a cycle-by-cycle basis and inserting the block header information and the nonce value into respective fields of the block header on the cycle-by-cycle basis, to compute the partial digest, on the cycle-by-cycle basis.

47. The method of claim 45, further comprising generating a nonce value on a cycle-by-cycle basis, and inserting the nonce value generated and the block header information into respective fields of the block header on the cycle-by-cycle basis, to compute the partial digest, on the cycle-by-cycle basis.

48. The method of claim 47, further comprising:
generating the nonce value as a function of a fixed value and a variable value; and
varying the variable value on the cycle-by-cycle basis.

49. The method of claim 48, further comprising assigning a respective unique identifier to at least one partial hash engine, wherein the fixed value is the respective unique identifier assigned.

50. The method of claim 48, wherein the variable value is a counter value of the counter and wherein the method further comprises resetting the counter in response to a reset signal.

51. The method of claim 32, further comprising submitting the final hash digest computed to a host processor, to effectuate the decision at the host processor for whether to submit the block candidate with the block header to the blockchain network.

52. The method of claim 32, further comprising:
determining a difference between the final hash digest computed and a target value; and
submitting the difference to a host processor, to effectuate the decision at the host processor for whether to submit the block candidate with the block header to the blockchain network, the block header including a representation of the target value.

53. The method of claim 32, further comprising:
determining whether the final hash digest satisfies a target value; and
in an event the final hash digest satisfies the target value, submitting the block candidate with the block header to the blockchain network, the block header including a representation of the target value.

54. The method of claim 53, further comprising:
converting the representation of the target value to the target value;
comparing the final hash digest computed to the target value; and
in an event the final hash digest computed is less than or equal to the target value, concluding that the final hash digest satisfies the target value.

55. The method of claim 32, wherein the block header is a bitcoin block header and wherein the method is employed in a bitcoin mining application-specific integrated method (ASIC).

56. An application-specific integrated circuit (ASIC) comprising:
a plurality of partial hash engines, a partial hash engine of the plurality of partial hash engines configured to (i) implement a hash function, partially, to compute a respective partial hash digest of a respective final hash digest for a respective block header of a block candidate for submission to a blockchain network and (ii) generate a respective notification based on the respective partial hash digest computed; and a complete hash engine configured to implement the hash function, completely and, in response to the respective notification generated, compute, in its entirety, the respective final hash digest for the respective block header of the block candidate for the submission.

57. The ASIC of claim 56, wherein the block header is a bitcoin block header and the ASIC is a bitcoin ASIC.

\* \* \* \* \*